Feb. 20, 1940. R. L. HALLOCK Re. 21,362
REFRIGERATION
Original Filed March 8, 1933
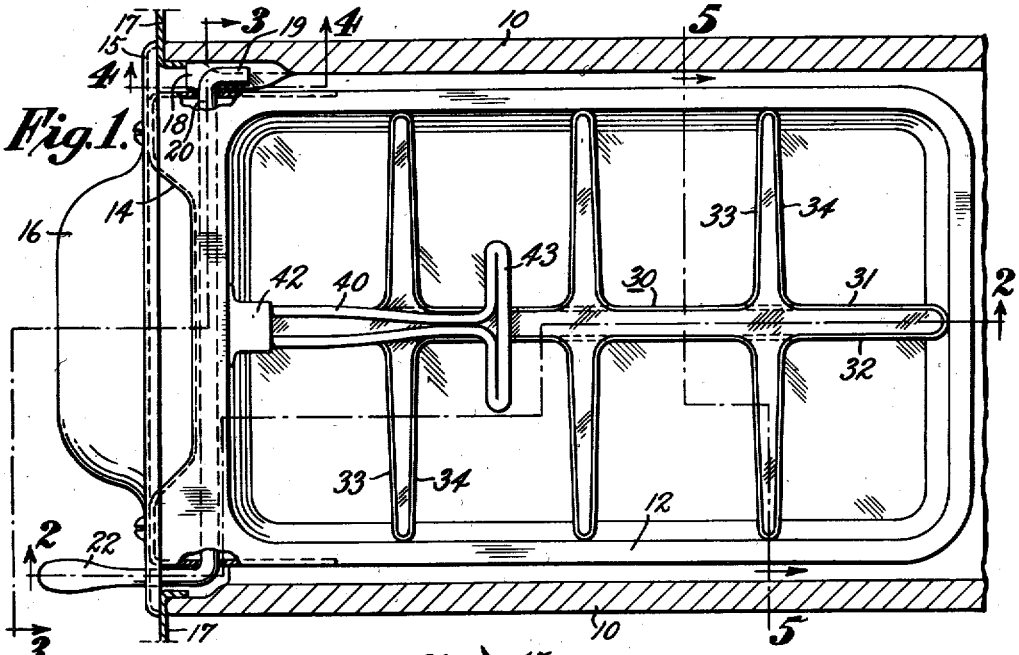
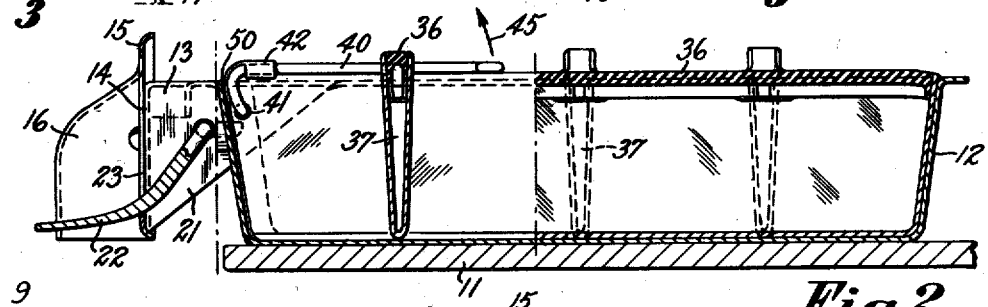
Fig.2.
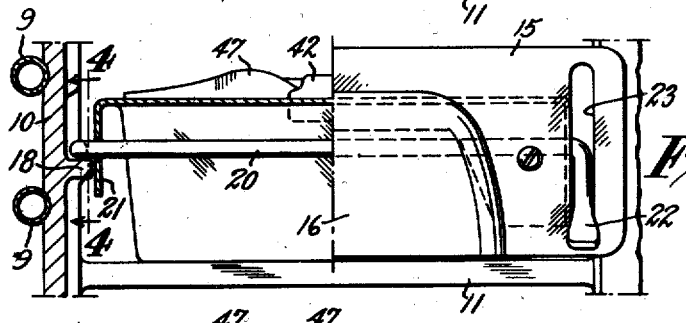
Fig.3.
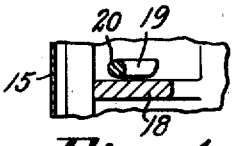
Fig.4.
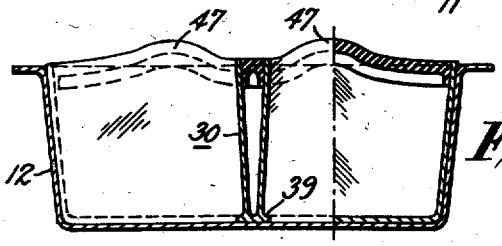
Fig.5.
INVENTOR
Robert Lay Hallock
BY
Wm. T. Hedlund
his ATTORNEY

UNITED STATES PATENT OFFICE 21,362

REFRIGERATION

Robert Lay Hallock, Larchmont, N. Y.

Original No. 2,009,802, dated July 30, 1935, Serial No. 660,001, March 8, 1933. Application for reissue July 23, 1937, Serial No. 155,269

36 Claims. (Cl. 62—108.5)

This application is in part a continuation of my copending application Serial No. 614,091, filed May 28, 1932, now patent No. 2,036,043.

My invention relates to refrigeration and more particularly to evaporators and ice-trays, including grids therefor, for refrigerating apparatus or machines.

The nature of my invention will become apparent from the following description taken in conjunction with the accompanying drawing showing a preferred form of my invention.

Of the drawing:

Fig. 1 is a plan view showing a section through an evaporator and the top of an ice-tray structure embodying the invention;

Fig. 2 is a cross sectional view taken on the line 2—2 of Fig. 1;

Fig. 3 is a front view partly in section and taken on the line 3—3 of Fig. 1;

Fig. 4 shows a detail and is a sectional view taken on the line 4—4 of Fig. 3; and Fig. 5 is a sectional view taken on the line 5—5 of Fig. 1.

The evaporator structure comprises side walls 10 and a shelf 11. The walls 10 are cooled below ice freezing temperature as by pipes 9 carrying refrigerant to be evaporated. The structure shown is a casting, but any type or kind of evaporator structure having ice-trays or freezing compartments is adapted to carry out the invention.

The shelf 11 supports an ice-tray structure comprising a tray body 12. The tray body is adapted to hold water to be frozen. The tray body is made of thin, flexible metal such is aluminum. At the forward end of the tray body is a flange structure 13 having a vertical forward wall 14 to which is attached a front cover plate 15 which is formed to provide a handle 16, of the type in which the fingers are inserted upwardly, for the removal of the tray. The cover plate 15 overlaps a metal side piece 17 which may be porcelained. The cover plate 15 has a vertical extent from the top of the shelf 11 to substantially the top of the next higher shelf, so that the sum of the cover plates of the ice-trays forms a closure for the front of the ice-tray compartment of the evaporator.

Formed in the side wall 10 is a projection or lug 18 extending inwardly above shelf 11. Immediately above lug 18 is the bent end 19 of a rotatable or turnable member 20. The member 20 is horizontally journalled in the ribs or webs 21 at the side of the tray body and the two ends are bent in opposite directions to form the projection 19 and an auxiliary handle 22 which projects forwardly through a slot 23 arranged vertically in the cover plate 15 and to one side of the handle 16.

Within the tray body is a grid structure generally designated at 30. This grid comprises hollow walls. Preferably the major portion of the grid structure is made of a phenol condensation product such as "Bakelite". The grid may be considered as made up of parallel backbone walls 31 and 32, and lateral walls 33 and 34. The grid proper may be said to be made up of a double-walled backbone and lateral double-walled webs. The backbone walls preferably extend continuously the full length of the grid or internal webs may be provided across the lateral webs to stiffen the grid longitudinally.

The opposite walls of the grid are closer together at the bottom than at the top so that the walls as a whole taper apart upwardly. The grid may be made as a casting with an open top, the open top being closed by a rubber member 36 which is cemented or glued to the less flexible material of the grid. Thus the grid encloses one or more hermetically sealed spaces 37; that is, isolated from the atmosphere so as to exclude water.

Preferably ledges or feet 39 are provided at the bottom of the grid walls 31 and 32 so that, on lifting the grid, the ice is certain to adhere to the grid. They need not and should not be placed on the lateral webs.

A lever 40 is provided at the forward end of the grid and attached thereto by passing through a hole 41 in the backbone of the grid below the top edge of the tray. As shown, in its down position, the lever 40 extends upwardly and rearwardly and is adapted to rest snugly against the upper edge of the grid. Lever 40 may be made of a single piece of bent wire on which is placed a reinforcing or bearing plate or member 42. Plate 42 is bent around the curve of the lever and is adapted to contact the forward upper inside edge of the tray body. The lever 40 has lateral extensions 43 adapted to be grasped by the fingers to pull the lever as indicated by the arrow 45 in Fig. 2 in order to pry the grid with ice pieces attached thereto away from the tray body.

The grid 30 is preferably provided with tabs 47 extending above the edge of the tray body. These tabs may be formed by raised parts in the lateral webs of the grid. The purpose of this is to provide places above the water level in the tray body which can readily be squeezed by the fingers to so push the grid walls together as to disengage the ice therefrom.

The apparatus operates, or, rather, is to be operated as follows:

The ice tray is filled with water, whereupon the grid is inserted so as to have the position shown in the drawing, and the tray is then inserted into the evaporator until the cover plate 15 abuts the plate 17. This abutment is a means for positioning the tray in the evaporator so that the lever part 19 is directly above the projection 18. Obviously the projection 18 need be only so wide as to be under and contacted by the lever part 19 when this part is lowered. Positioning of the ice tray in the evaporator compartment is therefore important and the abutment of the front cover plate with the evaporator structure accomplishes this. The part 19 will be held above the projection 18 due to preponderance of weight of the longer lever arm 22. The bottom of slot 23 provides a rest for the lever member and determines the non-operating position.

Assume now that the refrigerating apparatus has been operated a sufficiently long time to freeze the water in the tray.

It is well known that ice trays of this sort stick to the supporting shelf. To release the ice tray from the shelf, the forwardly projecting lever part 22 is raised vertically. This lever part can be turned through approximately 90 degrees and, in turn, will turn the rear projection 19 through the same angle. Thus the part 19 will move downwardly and contact the projection 18. Due to the relative lengths of the arms 22 and 19 a large force can be applied to projection 18 for a small lifting force under arm 22.

It will be noted that the upward reaction against the tray body is applied adjacent one corner of the tray. By using a thin metal tray and a somewhat flexible grid, the tray can be gradually peeled or sheared away from the shelf. This peeling or shearing is particularly facilitated if it is done from one corner of the tray.

The lever arm 22 is thus lifted and then dropped. The tray is now freed from the shelf. The tray is now removed from the evaporator by inserting fingers upwardly under the drawer type handle 16 and pulling the tray horizontally out from the evaporator compartment.

The tray with the ice in it frozen to the inner wall of the tray body may now be held in one hand while the fingers of the other hand are inserted under the projections 43 and the lever 40 pulled in the direction of the arrow 45. If desired, the projections may be somewhat higher than shown to facilitate passing the fingers thereunder. Practice shows, however, that it is wise not to fill the tray too full of water. Obviously some other structure may be used for the lever 40, such as a ring at the end of a flat bar.

Here again the flexible nature of the tray body comes into account. On pulling lever 40 upwards, the part 42 presses against the upper forward edge of the tray body at 50 and peels or shears the front of the tray body away from the grid with ice clinging thereto, gradually from the top downwardly. It will be noted that the lever is provided only at one end of the tray. At the same time, the lever exerts an upward force on the grid with respect to the tray body due to reciprocal pivoting on the tray at 50. Thus when the front has been peeled or sheared, the shearing proceeds along the bottom of the tray and the bottom of the tray is thus gradually peeled or sheared from the grid with attached ice from front to back. The grid becomes pivoted at the back upper end of the tray body and the back is thus also sheared away. The sides taper away from each other as shown in Fig. 5 and the ice has no difficulty disengaging itself from the side walls. Thus with a relatively small force the grid with ice cubes attached is entirely loosened from the tray.

The legs 39 and the rigidity of the backbone 31—32 assure that the ice cubes stick to the grid and prevent the grid from pulling up through the ice.

The best procedure now is to let the grid with ice cubes attached fall back into the ice tray body. The tabs 47 of two ribs in transverse alignment are then pressed between the thumbs and fingers while the hands are pushed toward each other. Pushing the thumb and finger on any one tab together shears the lateral walls away from the ice from the top downwardly while pushing the hands together pushes the backbone walls together to peel or shear them from the ice and also peel or shear the outside web edges from the ice. Thus applying longitudinal and transverse pressure to the webs in pairs causes all the ice cubes to be released from the grid. The grid, due to the feet 39, may now be lifted to remove the ice cubes from the tray.

Obviously, instead of using a narrow rubber member 36, the internal narrow spaces of the grid may be filled with yieldable material. A spongy material may be used with a water-proof coating on top. When pressed toward each other, the walls of the grid will spring out again due to the resiliency of the rubber 36 or the resiliency of the material of which the grid is principally made or both. The grid may be made of other material such as thin metal.

It will be obvious that the part 19 may be on the same side of the tray as the part 22. Also, separate pieces may be used to make up the leverage member. If the long and short arms of the lever are on the same side, the transverse turning part of the lever may be omitted and a supporting member may be substituted on which the lever is rotatably mounted. If desired, a stiff member may be placed longitudinally of the backbone part of the grid, particularly if internal reinforcing webs are omitted.

It will be obvious that a variety of other modifications may be made within the spirit and scope of the invention.

So much of the disclosure herein as relates to the separation of the ice tray from the evaporator, per se, is made the subject matter of and claimed in a copending application filed by me on May 1, 1934, Serial No. 723,293.

What I claim is:

1. A grid for an ice tray consisting of double-walled structure enclosing hermetically sealed space.

2. A grid for an ice tray comprising a double-walled backbone, lateral double-walled webs, and means forming hermetically sealed space within the double-walled parts.

3. A removable grid for an ice tray comprising a double wall web structure including pairs of wall parts adapted to be flexed toward each other, ledges on edges of the web structure, and a lever pivoted on said web structure.

4. The combination with an ice tray body made of thin flexible metal, of a grid therein, and a lever pivoted on said grid adjacent the top and inwardly of the edge thereof, said lever being bent to provide a portion adjacent a flexible edge of said tray body and a portion adapted to lie along the top of the grid, whereby on pulling the lever upwardly the tray body is sheared from the grid with ice attached thereto.

5. A removable grid for an ice tray comprising a double-walled hollow member closed at the bottom and sides and having a top opening and a rubber member closing said opening.

6. A removable grid for an ice tray comprising a double-walled back-bone, lateral double-walled webs, means for hermetically sealing space within said back-bone and said webs, opposite wall parts being yieldable toward each other, and lateral projections on the lower edge of the back-bone.

7. A removable grid for an ice tray comprising a double-walled back-bone, lateral double-walled webs, means for hermetically sealing space within said back-bone and said webs, lateral projections on the lower edge of the back-bone, and a lever attached to said back-bone.

8. A grid for an ice tray consisting of a double-walled flexible structure enclosing hermetically sealed space and having tabs adapted to be pressed by the fingers to squeeze opposite wall parts together.

9. A grid for an ice tray comprising a double-walled back-bone, lateral double-walled webs, means forming hermetically sealed space within the double-walled parts, and tabs on said lateral webs for squeezing opposite wall parts together.

10. The combination with an ice tray body made of flexible material, of a grid fitting therein consisting of a double-walled structure enclosing hermetically sealed space adapted to have opposite wall parts squeezed toward each other, and a lever pivoted on said grid adjacent the top and inwardly of an edge thereof, said lever having a portion adjacent an edge of said tray body and a portion adapted to lie along the top of the grid, whereby on pulling the lever upwardly the tray body is sheared from the grid with ice attached thereto.

11. A grid for an ice tray comprising a double-walled back-bone, lateral double-walled webs, and a rubber closure member, said parts enclosing hermetically sealed space.

12. In combination with an evaporator, an ice tray body made of flexible material, a grid therein consisting of a double-walled structure enclosing hermetically sealed space, means to gradually shear the tray body from the evaporator, and means to gradually shear the grid with ice attached thereto from the tray body.

13. Apparatus for producing ice pieces comprising a tray body and a grid member removably fitting into said tray body, said grid member comprising pairs of vertical walls joined together at their bottom edges and separated at the top edges, the material of said walls being resilient so that adjacent walls may be flexed together, and means for sealing the spaces between the respective pairs of walls to prevent entrance of fluid thereinto.

14. Apparatus for producing ice pieces comprising a tray body made of resilient material and a grid member comprising a central dividing portion and lateral dividing portions removably fitting into said tray body, said portions comprising pairs of vertical walls joined together at their bottom edges and relatively movable at their top edges, the material of said walls being resilient so that adjacent walls may be squeezed together, the vertical extent of said central portion making it less resilient to a vertical load than said tray body, and means pivotally mounted on said grid member for moving it in a vertical plane from said tray body.

15. Apparatus for producing ice pieces comprising a tray body adapted to hold water to be frozen and having resilient bottom and side walls, a grid unit removably fitting into said tray body and adapted to have ice cling thereto, and leverage means to distort a resilient side wall of said tray body and gradually peel said tray body away from said grid unit and ice clinging thereto.

16. Apparatus for producing ice pieces comprising a tray body adapted to hold water to be frozen and having resilient bottom and side walls, a grid unit removably fitting into said tray body and adapted to have ice cling thereto, and means to press a side wall of said tray body away from said grid unit and ice attached thereto and to exert a separating force between said grid unit and ice and the bottom of the tray body, whereby the grid unit and ice attached thereto is gradually sheared away from the tray body.

17. Apparatus for producing ice pieces comprising a tray body adapted to hold water to be frozen and having resilient bottom and side walls, a grid unit removably fitting into said tray body and adapted to have ice cling thereto, and a single lever mounted on one end of said grid unit and adapted to exert force against a resilient side wall of said tray body and to force the grid unit away from the bottom of the tray body whereby the grid unit with ice attached thereto is gradually peeled away from the tray body.

18. For use in an ice tray, a grid having longitudinal and transverse webs, said webs comprising spaced walls, the interior between said walls being sealed to prevent entrance of fluid thereinto and the walls being yieldable toward each other.

19. The combination with a metal tray body adapted to hold liquid for producing ice pieces, of a grid entirely separable from said tray body and incapable alone of holding liquid and consisting essentially of resilient webs having interior space sealed to prevent entrance of fluid.

20. The combination with a metal tray body adapted to hold liquid for producing ice pieces and having a resilient side and bottom walls, of a grid entirely separable from said tray and incapable alone of holding liquid and consisting essentially of resilient webs and a lever pivoted on said grid for separating the grid from the tray body.

21. Apparatus for producing ice pieces comprising a tray body, a grid member removably fitting into said tray body and separable therefrom, said grid member comprising pairs of walls yieldable in direction toward each other, and means for shearing the grid member with ice attached thereto from the tray body.

22. The combination with a metal tray body adapted to hold liquid for producing ice pieces, of a grid having webs comprising spaced walls adapted to be squeezed toward each other and sealed to prevent entrance of fluid between the walls.

23. The combination with a metal tray body adapted to hold liquid for producing ice pieces, of a grid having webs comprising spaced walls and sealed to prevent entrance of fluid between the walls, said walls being made of a phenol condensation product.

24. Apparatus for producing ice pieces comprising a tray body and a grid member removably fitting into said tray body and separable therefrom, said grid member comprising sets of spaced walls enclosing hermetically sealed spaces and yieldable in direction toward each other.

25. For use in an ice tray, a grid having opposite parallel relatively close walls joined at a plurality of edges and resiliently yieldable toward each other and opposite parallel relatively close walls joined at a plurality of edges and angularly disposed with respect to the first mentioned walls and integral therewith and resiliently yieldable toward each other.

26. The combination with an evaporator and an ice tray body made of flexible material and a grid adapted to be placed therein, of leverage mechanism acting between the tray body and the evaporator, and leverage mechanism acting between the grid and the tray body, the tray body being bendable at the places where the force is applied between the tray body and ice adhering thereto, whereby the leverage mechanisms operate to gradually peel the ice tray body from the evaporator and to gradually peel the grid with ice attached thereto from the tray body.

27. The combination with a flexible ice tray body, of a grid fitting therein, and a lever pivoted on said grid and having a portion positioned to contact a flexible edge of said tray body, the combination being so constructed that on operating the lever, the flexible edge is bent away from the grid and the tray body is gradually peeled from the grid with ice attached thereto, said grid having flexible webs to permit removal of ice cubes therefrom.

28. The combination with an evaporator and a flexible ice tray body and a flexible grid fitting therein, of means to gradually peel the ice tray body from the evaporator and means to gradually peel the grid with ice attached thereto from the tray body.

29. Apparatus for producing ice pieces comprising a resilient tray body and a grid member, said grid member including a backbone and lateral dividing portions and removably fitting into said tray body, said portions including pairs of vertical walls joined together at their bottom edges and relatively movable at their top edges, the material of said walls being resilient so that adjacent walls may be flexed together, said backbone being less resilient to vertical load than said tray body, and means pivotally mounted on said grid member for moving it in a vertical plane from said tray body.

30. A grid for an ice tray having a central part and double walled hermetically sealed lateral webs.

31. In combination, an ice tray for refrigerators, a removable grid located in said tray and defining compartments therein, a handle upon said grid, and means actuated by the upward movement of said handle and engageable with said tray to exert a leverage upon the latter to facilitate removal of said grid from said tray.

32. The combination with an evaporator and an ice tray body made of flexible material and of such form as to be bendable when containing ice frozen therein and a grid therein, of force multiplying means actuatable to exert reactive forces between the ice tray body and the evaporator to gradually peel the ice tray body from the evaporator and force multiplying means actuatable to exert reactive forces between the grid and the tray body to gradually peel the grid with ice attached thereto from the ice tray body.

33. Apparatus for producing ice pieces comprising a tray body, a grid member removably fitting into said tray body and separable therefrom, said grid member comprising pairs of relatively movable walls, a backbone structure joining said pairs of walls so that the grid as a whole is rigid when being removed from the tray body, the walls of the respective pairs being respectively attached to each other at some places and detached from each other at other places to permit partial relative movement for release of ice cubes.

34. Apparatus for producing ice pieces comprising a tray body and a grid member removably fitting into said tray body and separable therefrom, said grid member comprising pairs of relatively movable walls, said walls being attached to each other at certain places and free for movement relative to each other at other places for flexure to release ice pieces, and means for separating the grid member with ice attached thereto from the tray body.

35. Apparatus for producing ice pieces comprising an ice tray and a removable grid located in said tray and defining compartments therein, said grid having a vertical backbone part extending continuously substantially the full length of the interior of the tray and double walled flexible lateral webs.

36. Apparatus for producing ice pieces comprising an ice tray and a removable grid located in said tray, said grid having a vertical backbone part extending continuously substantially the full length of the interior of the tray and double walled hermetically sealed lateral webs, a lever pivoted on said backbone part, and said backbone part being of sufficient rigidity in the plane of movement of the lever to give rigidity to the grid with ice attached thereto.

ROBERT LAY HALLOCK.